(12) United States Patent
Ito et al.

(10) Patent No.: US 6,588,495 B2
(45) Date of Patent: Jul. 8, 2003

(54) AIR PASSAGE SWITCHING DEVICE AND VEHICLE AIR-CONDITIONER

(75) Inventors: Koichi Ito, Kariya (JP); Haruki Ikuta, Hekinan (JP)

(73) Assignee: Denso Corporation, Kariya (JP)

( * ) Notice: Subject to any disclaimer, the term of this patent is extended or adjusted under 35 U.S.C. 154(b) by 4 days.

(21) Appl. No.: 09/760,283

(22) Filed: Jan. 12, 2001

(65) Prior Publication Data

US 2001/0008183 A1 Jul. 19, 2001

(30) Foreign Application Priority Data

Jan. 14, 2000 (JP) ........................................ 2000-010155

(51) Int. Cl.⁷ .............................. B60H 1/24; B60H 1/00
(52) U.S. Cl. .............................. 165/41; 165/42; 165/43; 165/103; 454/121; 454/126; 454/156; 454/160; 454/161; 237/12.3 A; 237/12.3 B; 251/901; 251/175; 137/872
(58) Field of Search ............................. 165/42, 43, 41, 165/103; 251/901, 175; 454/121, 126, 160, 161, 156; 237/12.3 A, 12.3 B; 137/872

(56) References Cited

U.S. PATENT DOCUMENTS

| 5,701,949 A | 12/1997 | Yamaguchi et al. |
| 5,893,407 A | * 4/1999 | Okamoto et al. ............. 165/42 |
| 5,899,262 A | 5/1999 | Yamaguchi et al. |

FOREIGN PATENT DOCUMENTS

EP          0681934        * 11/1995

* cited by examiner

*Primary Examiner*—John K. Ford
(74) *Attorney, Agent, or Firm*—Harness, Dickey & Pierce, PLC (57) ABSTRACT

The present invention provides anchor tabs at opposite ends of a film member that are anchored to side faces of a door plate of a sliding door. Draft deflectors prevent the inflow of air to between the anchor tabs and the side faces of the door plate. Thus, inflow of air to between the anchor tabs of the film member and the side faces of the door plate is prevented. Also, fluctuations in pressure difference between the inner and outer sides of the anchor tabs are suppressed, and the production of extraneous noise caused by self-excited vibration of the anchor tabs at the ends of the film member is suppressed.

15 Claims, 13 Drawing Sheets

AIR PASSAGE SWITCHING DEVICE AND VEHICLE AIR-CONDITIONER

CROSS-REFERENCE TO RELATED APPLICATION

The present invention is related to Japanese patent application No. 2000-10155, filed Jan. 14, 2000; the contents of which are incorporated herein by reference.

FIELD OF THE INVENTION

The present invention relates to an air passage switching device, and more particularly to an air passage switching device for switching air passages with a film-type sliding door.

BACKGROUND OF THE INVENTION

In Japanese Unexamined Patent Publication No. H.8-258538, the present inventors have previously proposed an air passage switching device for switching air passages with a film-type sliding door. Based on this related art, the present inventors are developing the air passage switching device shown in FIG. 16. In this device under development, a substantially flat plate-shaped sliding door 27 is disposed slidably in the direction of arrow B in a case 12a, facing an opening face of an air passage 22 (23). This sliding door 27 includes a door plate 28 in which is formed an opening 28a and a film member 29 fixed to opposite ends of this door plate 28.

Here, slot-shaped anchoring holes (not shown) are provided in anchor tabs 29b at opposite ends of the film member 29. By fitting these slot-shaped anchoring holes over anchor pins 28c, provided integrally with side faces of the door plate 28, the ends of the film member 29 are anchored to the side faces of the door plate 28 so they can displace in the vertical direction of FIG. 16 within the range of the slot length dimension of the anchoring holes.

Figure 16:
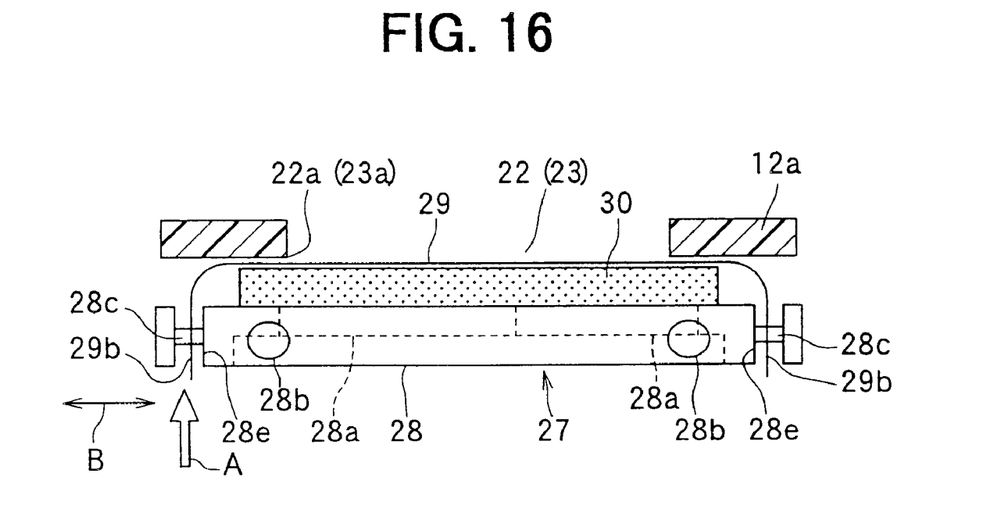
FIG. 16 is a sectional view illustrating an air passage switching device using a sliding door being developed by the present inventors.

Then, when from the arrow A direction an air current blows against the inner face of the film member 29 through the opening 28a, a draft pressure causes the film member 29 to press against edge seal faces 22a (23a) of the air passage 22 (23) and seal the air passage 22 (23). And by the sliding door 27 sliding in the direction of arrow B along an inside face of the case 12a, the film member 29 opens and closes the air passage 22 (23) and thus switches the air passage. Also, an elastic member 30 made of a spongelike porous resin foam material or the like is disposed between the door plate 28 and the film member 29.

In this device under development, a disagreeable extraneous noise (a flapping noise) arises when the film member 29 is employed. And when the present inventors investigated the causes of this extraneous noise through experiment, it was found that the extraneous noise arises for the following reasons. Specifically, when either of the anchor tabs 29b at the ends of the film member 29 is positioned in an air current, the air current strongly strikes both the inner face and the outer face of this anchor tab 29b. Furthermore, because the flow passage between the inner side of the anchor tab 29b and the side face 28e of the door plate 28 is small and irregular in sectional shape, when air flows here, it promotes fluctuations in pressure difference across the inner and outer faces of the film member 29.

These fluctuations in pressure difference across the inner and outer faces of the film member 29 and reactions of the film member. 29 itself cause the film member 29 to undergo self-excited vibration. That is, because the anchor tabs 29b at the ends of the film member 29 are allowed by the slot-shaped anchoring holes to displace with respect to the side faces 28e of the door plate 28, the above-mentioned pressure difference fluctuations and film reactions cause the anchor tabs 29b at the ends of the film member 29 to repeat small displacements and undergo self-excited vibration. And as a result, the anchor tabs 29b at the ends of the film member 29 repeatedly interfere with the side faces 28e of the door plate 28 and produce extraneous noise.

SUMMARY OF THE INVENTION

It is therefore an object of the present invention to suppress the production of extraneous noise caused by self-excited vibration of anchor tabs at the ends of a film member in an air passage switching device using a film-type sliding door.

To achieve this and other objects, in a first aspect, the present invention provides an air passage switching device wherein anchor tabs at either end of a film member are anchored to side faces of a door plate. The door plate is provided with draft deflectors that prevent the inflow of air to between the anchor tabs and the side faces.

Accordingly, the inflow of air to between the anchor tabs of the film member and the side faces of the door plate is prevented by the draft deflectors of the door plate. Consequently, fluctuations in pressure difference between inside and outside the anchor tabs at the ends of the film member are suppressed and the production of extraneous noise caused by self-excited vibration of the anchor tabs at the ends of the film member is suppressed.

According to a second aspect, the draft deflectors are formed as flat plates positioned on upstream sides of the anchor tab ends.

In a third aspect, the draft deflectors are positioned on the upstream sides of the ends of the anchor tabs and are formed as gutters for receiving the ends of the anchor tabs. Here, both the inner and outer sides of the anchor tabs of the film member are covered by the gutter-shaped draft deflectors, and a main current of an air flow is prevented from directly striking the inner and outer sides of the anchor tabs. Consequently, the effect of suppressing self-excited vibration of the anchor tabs of the door plate is further increased.

In another aspect, the anchor tabs are anchored to the side faces of the door plate at a plurality of locations in the width direction of the film member. Also, an anchor span which is the spacing between the anchored parts of the anchor tabs at said plurality of locations is not more than 100 mm.

Experimental studies carried out by the present inventors have confirmed that making the anchor span 100 mm or less raises the constraining effect on the anchor tabs of the film member and increases suppression of the self-excited vibration of the anchor tabs.

In a fifth aspect, the sliding door comprises a flexible film member that presses against edge seal faces of the air passages. The member closes the air passages and a door plate having openings for allowing a draft pressure to act on the film member. The film member is provided at both ends, in a direction orthogonal to the sliding direction of the sliding door, with anchor tabs. These anchor tabs are anchored to side faces of the door plate. The case has concavities formed in inner walls for receiving the anchor tabs. The inflow of air to between the anchor tabs and the side faces is prevented by these concavities.

In this case, the inflow of air to between the anchor tabs and the side faces of the door plate is prevented by the concavities on the case side and the self-excited vibration of the anchor tabs is suppressed.

In a sixth provision, the door plate is provided on the side faces with guide pins slidably supported by the case and the anchor tabs are anchored to the side faces by means of these guide pins and are sandwiched between the side faces and inner wall faces of the case.

In this way, the guide pins can act as parts for the film member for anchoring, and the construction of the device is thus simplified. Furthermore, by the anchor tabs being sandwiched between the side faces and the inner walls of the case, the anchor tabs are prevented from slipping off the guide pins. As a result, the guide pins can be simple cylindrical pins, and there is no need for enlarged retaining portions to be formed at the tips of the guide pins this eases assembly of film member to the side faces of the door plate.

In another aspect, anchor tabs at opposite ends of the film member are bent toward side faces of the door plate. Grooves into which the ends of the anchor tabs can be inserted are provided in the side faces of the door plate. As a result of the ends of the anchor tabs being inserted into the grooves, the inflow of air to between the anchor tabs and the side faces is prevented by the bent shape of the anchor tabs. In this case, the self-excited vibration of the anchor tabs is suppressed by an extremely simple construction using a bent shape of the anchor tabs.

In an eighth provision, anchor tabs at opposite ends of the film member are anchored to side faces of the door plate at a plurality of locations in the width direction of the film member. Cutaways are formed in the anchor tabs between the locations at which the anchor tabs are anchored to the side faces.

In this case, because air can pass freely through the cutaways in the anchor tabs, fluctuations in pressure difference between inside and outside the anchor tabs are suppressed and consequently self-excited vibration of the anchor tabs is suppressed.

In another aspect, the film member comprises a seal face for pressing on edge seal faces of the air passages and anchor tabs bent from opposite ends of the seal face toward side faces of the door plate and anchored to the side faces. The bend angle of the anchor tabs with respect to the seal face is smaller than 90°.

In this case, because the anchor tabs have an acute bend angle, the ends of the anchor tabs come nearer to the side faces of the door plate and the gaps between the anchor tabs and the side faces of the door plate are narrowed. Consequently, it is less easy for air to flow into these gaps. As a result, self-excited vibration of the anchor tabs is suppressed.

In another aspect, the bend angle $\theta$ is preferably in the range 80° to 89°. When the bend angle $\theta$ is made small, the ends of the anchor tabs directly contact the side faces of the door plate and cause a change in the shape of the seal face of the film member. This degrades sealing. Therefore, the bend angle $\theta$ is given a lower limit of 80°. And the upper limit on the bend angle $\theta$ is 89°, to obtain an acute bend shape angle.

In another aspect, the invention provides a vehicle air-conditioner wherein the sliding door opens and closes air passages through which air flows into a passenger compartment.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

First Preferred Embodiment

FIGS. 1 through 6 show a first preferred embodiment of the present invention. A vehicle air-conditioner of this preferred embodiment is a rear seat air-conditioner for air-conditioning a rear seat side space in a vehicle having a large passenger compartment, such as a one box car.

Figure 1:
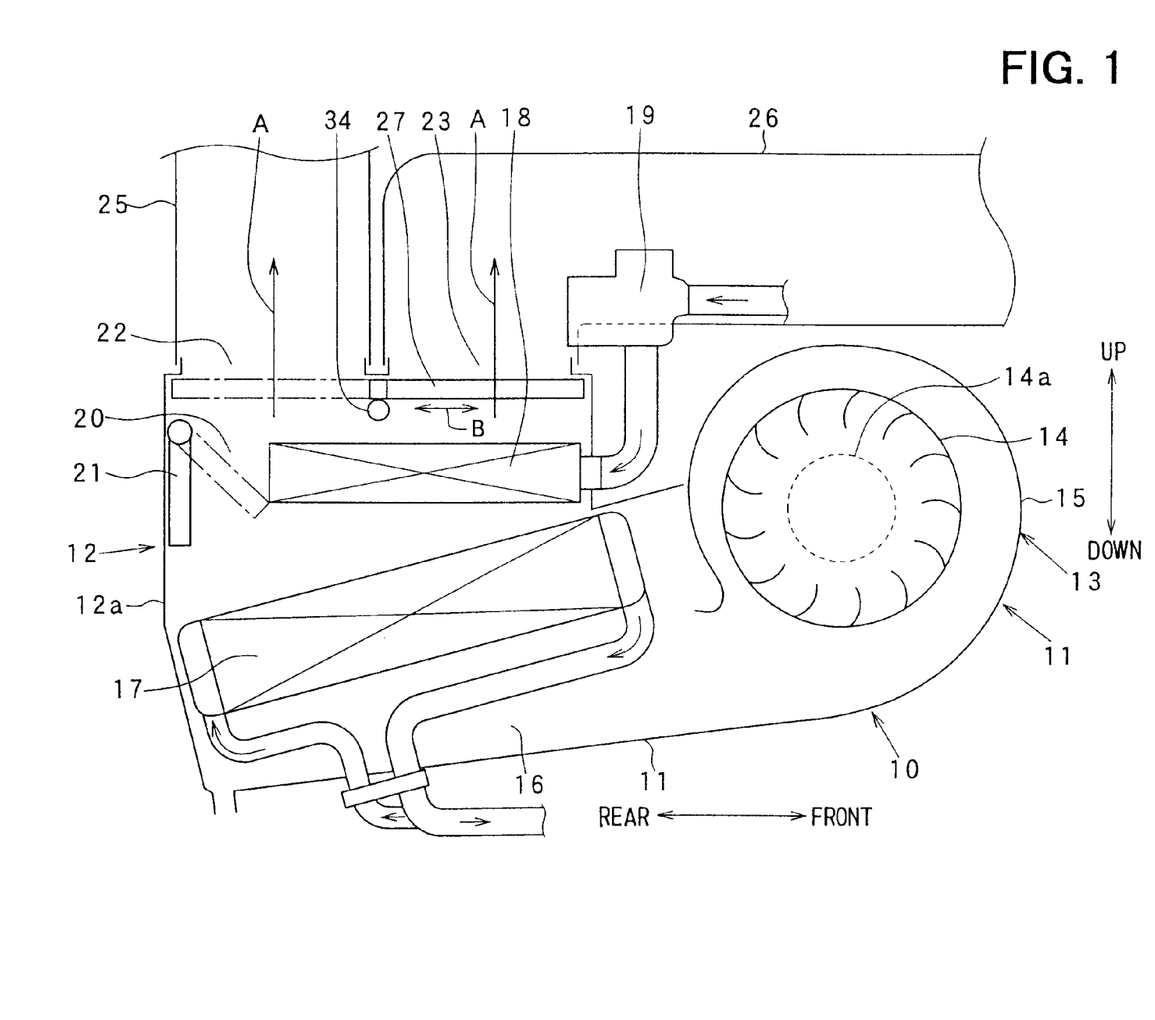
FIG. 1 is a schematic sectional view of a rear seat air conditioner for a vehicle according to a first embodiment of the present invention.

Referring first to FIG. 1, rear seat air-conditioner 10 has a main body mounted near the floor of a rear part of a vehicle between a vehicle outer wall and a vehicle inner wall. The vehicle air-conditioner 10 consists mainly of a blower unit 11 and an air-conditioning unit 12 aligned in the front-rear direction of the vehicle. The blower unit 11 pumps inside air from the rear part of the passenger compartment to the air-conditioner 10. In this preferred embodiment, the blower unit 11 only takes in inside air. The blower unit 11 has an inside air intake opening (not shown) formed in each of its sides (that is, its ends in the width direction of the vehicle, the direction perpendicular to the paper in FIG. 1).

The blower unit 11 has a centrifugal electric blower 13. This blower 13 has a centrifugal fan 14 and a fan motor 14a, and the centrifugal fan 14 is rotatably mounted inside a scroll housing 15. A duct 16 constituting a flow passage extending in the front-rear direction of the vehicle is formed on the downstream side of the scroll housing 15. This duct 16 changes the flow direction of air delivered by the blower unit 11 from downward to upward and guides it into evaporator 17. An outlet of the blower unit 11 is connected to an inlet of the air-conditioning unit 12 by duct 16.

The air-conditioning unit 12 is disposed behind the blower unit 11 in the front-rear direction of the vehicle and has a resin case 12a forming an air passage extending upward. Inside the case 12a of the air-conditioning unit 12 is the above-mentioned evaporator 17, a heat exchanger for cooling air-conditioning air. A heater core 18 inside the case 12a, which is a heat exchanger for heating air-conditioning air, is positioned on the downstream side of the evaporator 17 in the air flow. The evaporator 17 and the heater core 18 are mounted inside the air-conditioning unit 12, one above the other, so that their main faces are roughly horizontal.

Thus, delivered air guided into the case 12a of the air-conditioning unit 12 flows upward and passes through the evaporator 17 and the heater core 18. In a known fashion, the evaporator 17 cools and dehumidifies air inside the case 12a with low-pressure refrigerant of a refrigerating cycle circuit passing through the inside of the evaporator 17 that absorbs heat from the air. The heater core 18 heats a cool draft cooled by the evaporator 17 with warm water from a vehicle engine (cooling water) as a heat source.

In this preferred embodiment, a warm water valve 19 for adjusting a flow of warm water to the heater core 18 is provided in a warm water circuit serving the heater core 18. Outlet temperature of air entering the passenger compartment is controlled by the flow of warm water to the heater core 18 being adjusted by aperture adjustment of this warm water valve 19.

A cool-draft bypass passage 20 through which air (a cool draft) having passed through the evaporator 17 can bypass the heater core 18 is also provided in the case 12a of the air-conditioning unit 12. This cool draft bypass passage 20 is opened and closed by a cool draft bypass door 21. In the case 12a of the air-conditioning unit 12, a face port 22 and a foot port 23 are formed on the downstream side of (i.e. above) the heater core 18. The face port .22 delivers an air-conditioning draft temperature-adjusted by the heater core 18 toward the upper bodies of rear seat occupants, and is connected by a face duct 25 to rear seat face outlets (not shown) in the ceiling of the vehicle. Foot port 23 delivers an air-conditioning draft temperature-adjusted by the heater core 18 toward the feet of rear seat occupants, and is connected by a foot duct 26 to rear seat foot outlets (not shown) positioned at the feet of rear seat occupants.

The face port 22 and the foot port 23 constitute air passages of the present invention and are opened and closed by a sliding door 27, whereby it is possible to switch between three ordinary air-conditioning outlet modes: a FACE mode, a BI-LEVEL mode and a FOOT mode.

Figure 2:
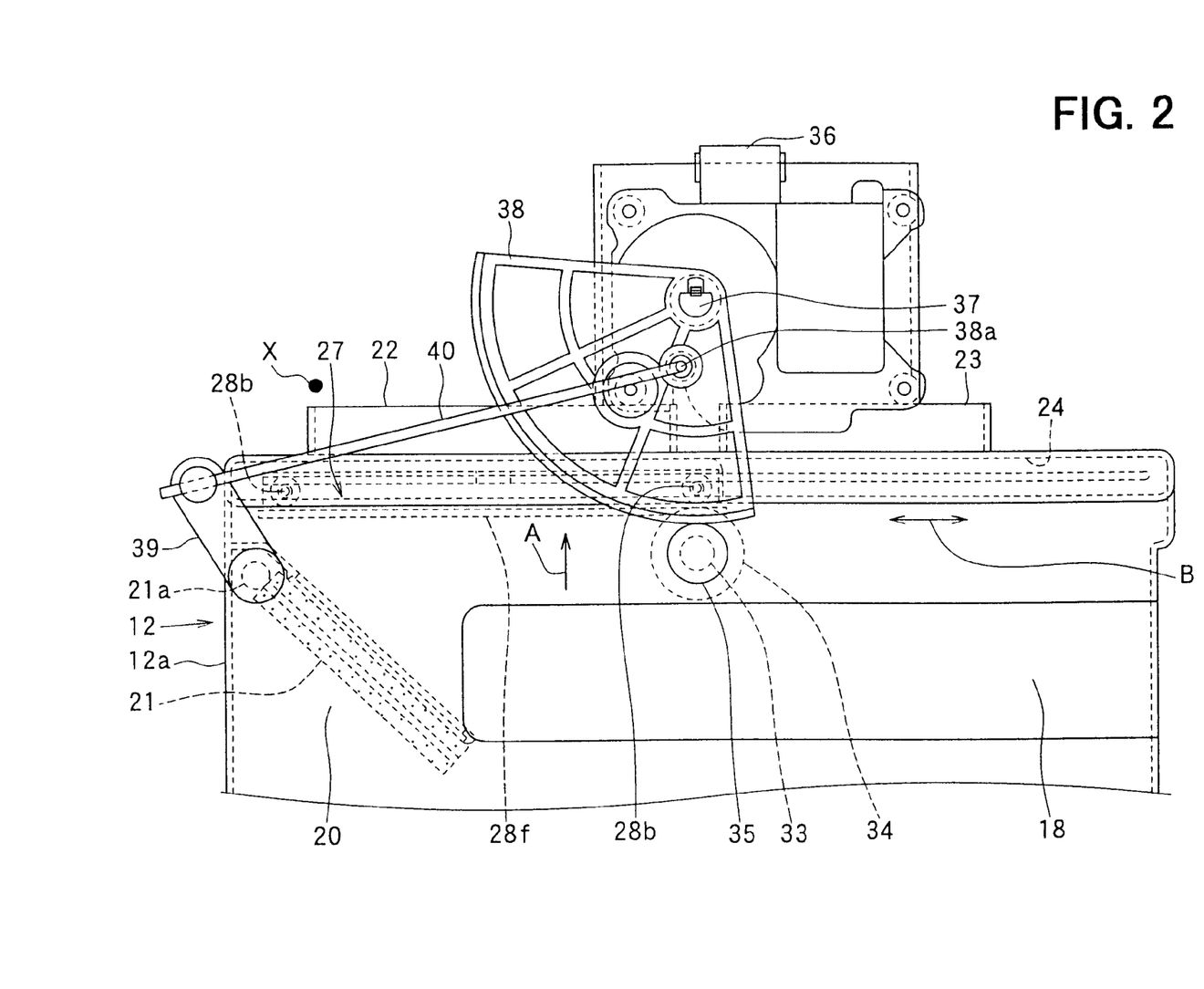
FIG. 2 is a plan view of a portion of the rear seat air conditioner according to the present invention.

Next, a specific example of a driving mechanism of this sliding door 27 will be described. As shown in FIG. 2, the sliding door 27 slides in the direction of arrow B along an air passage opening face 24 of the face port 22 and the foot port 23 provided in the case 12a of the air-conditioning unit 12.

Figure 3:
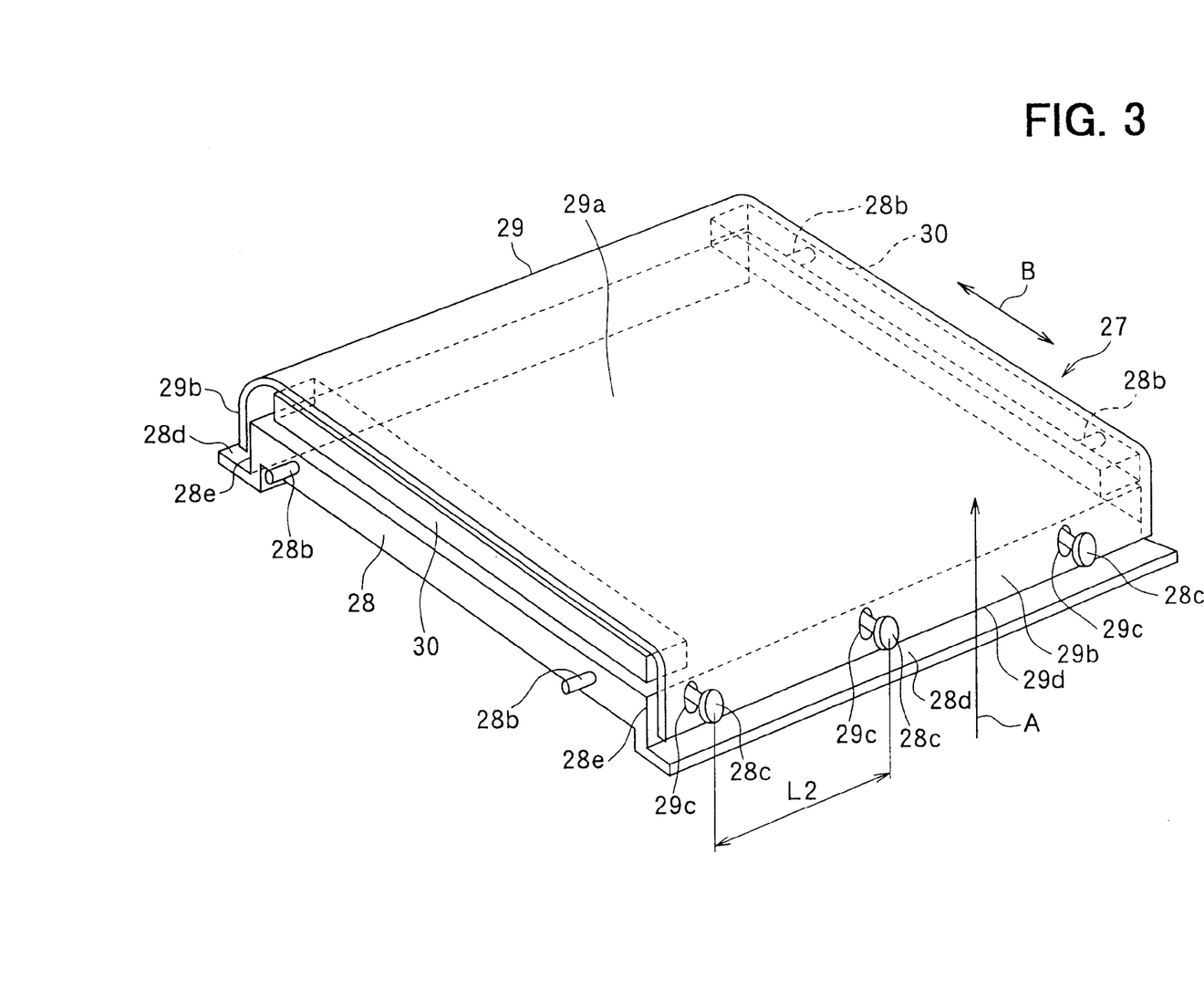
FIG. 3 is a perspective view of a sliding door according to the present invention.
Figure 4:
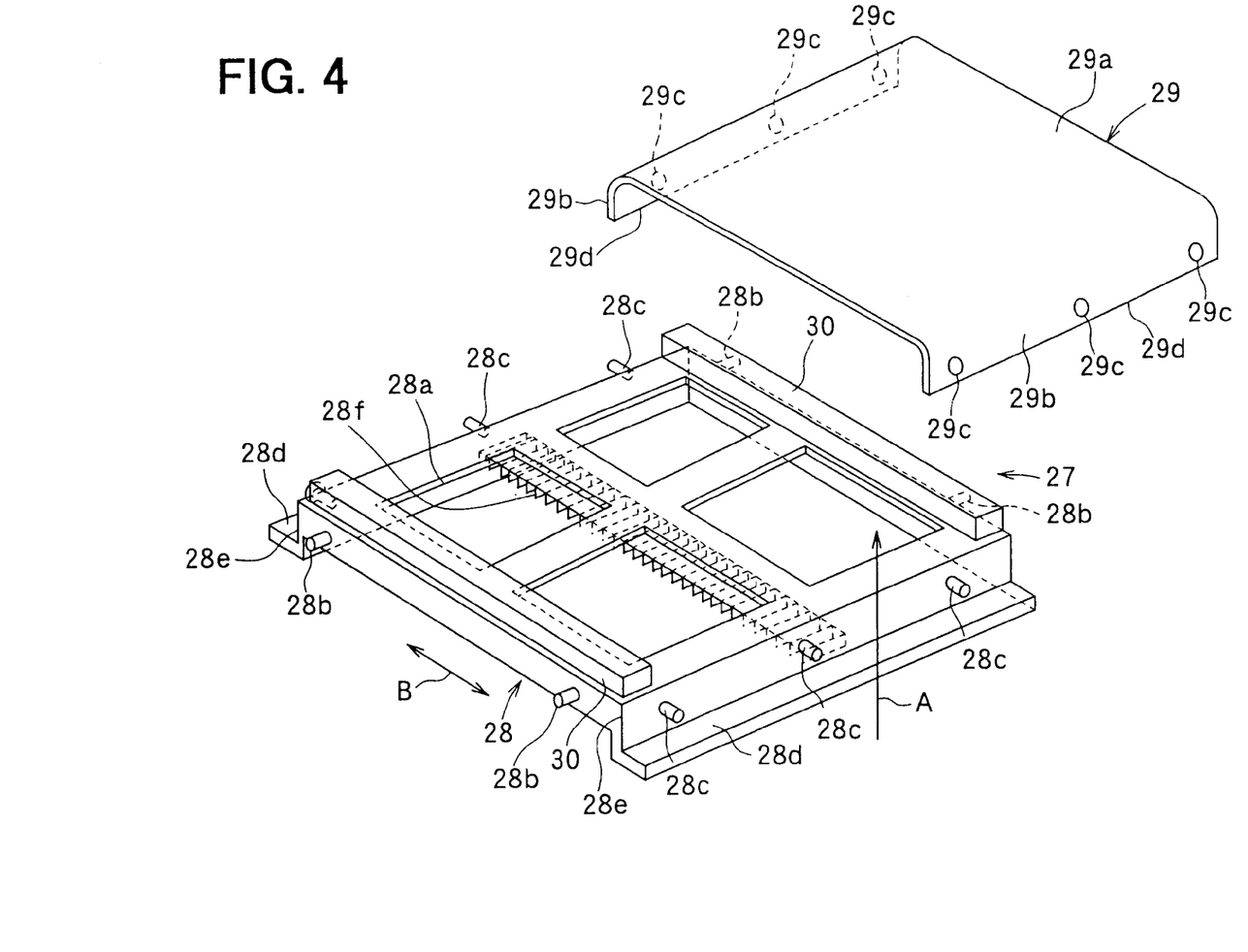
FIG. 4 is an exploded perspective view of a door plate and a film member of the sliding door according to the present invention.

As shown in FIGS. 3 and 4, the sliding door 27 has a door plate 28 and a film member 29 supported by door plate 28. The door plate 28 is molded from a resin such as polypropylene and has a flat frame shape forming a plurality of (in the example shown in FIG. 4, four) openings 28a. The film member 29 is attached to the upper face (the face on the opening face 24 side) of the door plate 28 to cover the door plate openings 28a. The openings 28a allow a draft pressure inside the case 12a to act on the film member 29.

The film member 29 has a seal face 29a pressing against edge seal faces 22a, 23a of the ports 22, 23 is anchored to the door plate 28 by anchor tabs 29b. These anchor tabs 29b are located at the door sliding direction B ends of the film member 29 and are bent approximately at right angles to the seal face 29a and anchored to side faces 28e of the door plate 28 at its ends in the door sliding direction B. Thus the anchor tabs 29b are substantially parallel with the side faces 28e of the door plate 28. The seal face 29a has a larger area than either of the ports 22, 23 to close either ports 22, 23.

Elastic members 30 are adhered to either side (that is, either end in a direction orthogonal to the door sliding direction B) of the upper face of the door plate 28. These elastic members 30 are made of an elastic material such as a spongelike porous resin foam, and press the film member 29 against the edge seal faces 22a, 23a at all times. As such, the film member 29 does not impact the edge seal faces 22a, 23a and produce extraneous noise such as a slapping during start-up of the blower.

The film member 29 is molded from a resin material in the form of a thin film having a certain degree of flexibility, a low frictional resistance, and no permeability to air. Specifically, the film member 29 consists for example of a PET (PolyEthylene Terephthalate) film of thickness 188 $\mu$m.

A plurality of anchoring holes 29c that anchor the film member 29 to the door plate 28 with are provided in each of the anchor tabs 29b of the film member 29. As shown in FIGS. 3 and 4, the anchoring holes 29c are slot-shaped and have their length directions so oriented as to be parallel with the air flow direction A when the film member 29 is attached to the door plate 28. To allow the film member 29 to move toward the opening face 24 and press against the edge seal faces 22a, 23a under a draft pressure, the length direction dimension of the slot-shaped holes is set to be greater than the amount of such movement of the film member 29.

As shown in FIG. 4, the same number of anchor pins 28c as there are respective anchoring holes 29c are integrally molded projecting from each of the side faces 28e at the ends of the door plate 28, and the anchor tabs 29b of the film member 29 are anchored to the side faces 28e of the door plate 28 by the anchoring holes 29c in the anchor tabs 29b of the film member 29 being fitted over these anchor pins 28c and the tips of the anchor pins 28c then being thermally finished. FIG. 3 shows the anchor pins 28c after their tips are enlarged by thermal finishing. Here, when thermal finishing is carried out, by the deformation of the anchor pin tip (head) in the axial direction of the pin being made small, a clearance is formed between the side face 28e of the door plate 28 and the thermally finished part of the anchor pin head. As a result, the film member 29 can move in the door sliding direction B and dimensional dispersion in the manufacture of the film member 29 and the door plate 28 can be absorbed.

Figure 5:
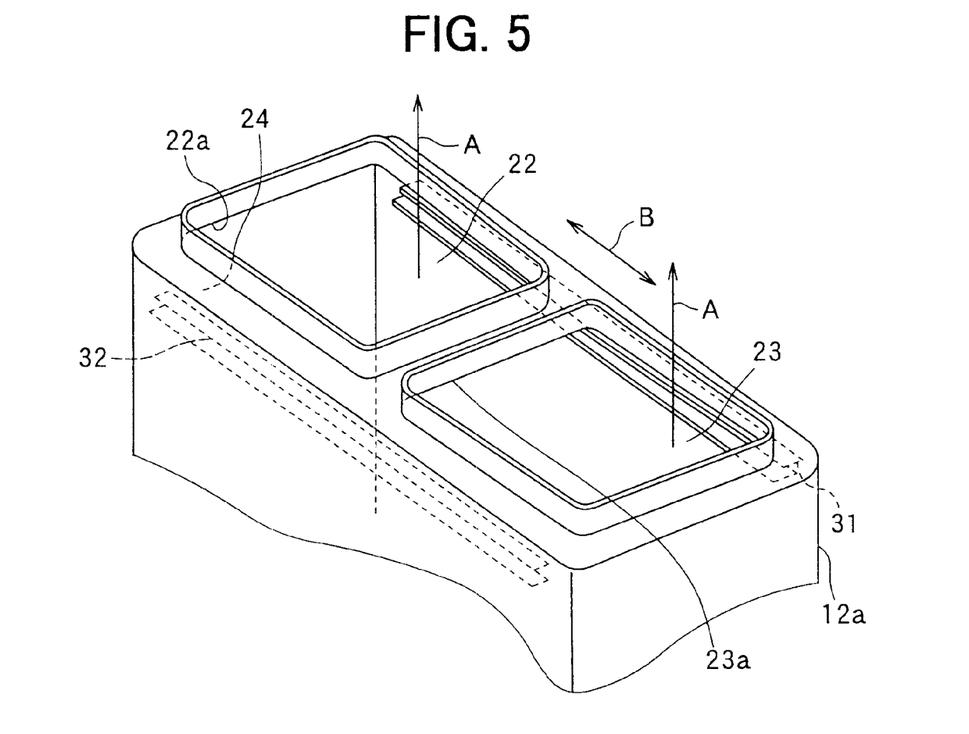
FIG. 5 is a perspective view of an upper case for a rear seat air conditioner for a vehicle according to the present invention.

Guide pins 28b are integrally molded to project from two locations on each side face of the door plate 28 (its left and right end faces in the direction orthogonal to the door sliding direction B). These guide pins 28b guide sliding of the sliding door 27 in the direction of the arrow B. That is, as shown in FIG. 5, in the case 12a, horizontal guide channels 31, 32 extending parallel with the door sliding direction B are provided on the inner walls of the case 12a below the face port 22 and the foot port 23. The guide pins 28b are fitted slidably in these guide channels 31, 32. As a result, the sliding door 27 is held in the case 12a slidably in the direction of arrow B by the mating between the guide pins 28b and the guide channels 31, 32.

Figure 6:
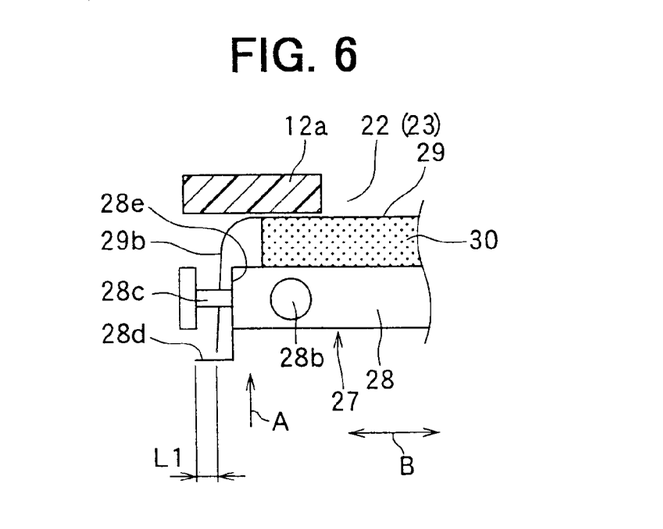
FIG. 6 is a detail view of the sliding door according to the present invention.

Also, in this preferred embodiment, as shown in FIGS. 3 and 4, draft deflectors 28d for deflecting draft away from the anchor tabs 29b at each end of the film member 29 are molded integrally with lower faces (faces on the heater core 18 side) of the door plate 28. These draft deflectors 28d are so molded as to be positioned on the upstream sides of the ends 29d of the anchor tabs 29b in the air flow and are for shielding from the air flow the ends 29d of the anchor tabs 29b at the ends of the film member 29. To this end, the draft deflectors 28d are formed as flat plates extending over the full length of the width dimension (the dimension in a direction orthogonal to the door sliding direction B) of the film member 29. And, as shown in FIG. 6, the draft deflectors 28d project outward of the anchor tabs 29b of the film member 29 in the door sliding direction B by at least a predetermined dimension L1 (for example at least 1 mm).

On the lower face of the doorplate 28, as shown in FIG. 4, a rack 28f extending parallel with the door sliding direction B is formed integrally with the door plate 28. This rack 28f is formed on the lower side of a central portion of the door plate 28.

And as shown in FIG. 2, inside the case 12a, directly below the sliding door 27 and between the face port 22 and the foot port 23, a rotary shaft 33 is mounted in a direction orthogonal to the door sliding direction B. This rotary shaft 33 is made of resin and is rotatably supported by bearing holes (not shown) in the walls of the case 12a. A pinion 34 is provided on this rotary shaft 33 by integral molding with resin at a central location facing the rack 28f. This pinion 34 is positioned inside the case 12a and meshes with the rack 28f.

One end of the rotary shaft 33 projects to outside the case 12a. A driving gear 35 is provided on this projecting part of rotary shaft 33. This driving gear 35 is also molded from resin integrally with the rotary shaft 33. A servo motor 36 constituting a door driving device is mounted on the upper side of the case 12a, as shown in FIG. 2. A sector gear 38 is attached to the output shaft 37 of the servo motor 36. This sector gear 38 meshes with the driving gear 35.

By this means, rotation of the servo motor 36 is transmitted via the sector gear 38 and the driving gear 35 to the rotary shaft 33. And, rotation of the rotary shaft 33 is converted to straight-line motion of the sliding door 27 by the meshing between the pinion 34 and the rack 28f.

In this preferred embodiment, a rotary shaft 21a of the cool draft bypass door 21 for opening and closing the cool draft bypass passage 20 is linked by links 39, 40 to a pin 38a of the sector gear 38. The cool draft bypass door 21 is thereby pivoted in cooperation with rotation of the sector gear 38.

The operation of the air-conditioner will now be described. By selecting a rotation direction and a rotation amount of the output shaft 37 of the servo motor 36 the position of the sliding door 27 can be freely set in the direction of arrow B. By this means, the face port 22 and the foot port 23 can be opened and closed and thereby select the FACE mode, the FOOT mode or the BI-LEVEL mode as desired. And when the. FACE mode is set, the cool draft bypass door 21 cooperatively opens the cool draft bypass passage 20. And in the BI-LEVEL mode, the cool draft bypass door 21 may be opened by a predetermined amount to make the face outlet temperature lower than the foot outlet temperature.

Next, an extraneous noise suppressing action of the film member 29 of this preferred embodiment will be explained.

As shown in FIGS. 3 and 4, draft deflectors 28d for deflecting draft away from the anchor tabs 29b at the ends of the film member 29 are molded integrally with the door plate 28, and shield from air flow the ends 29d of the anchor tabs 29b at the ends of the film member 29.

Here, because the flow passages between the side faces 28e of the door plate 28 and the anchor tabs 29b at the ends of the film member 29 are small and irregular in sectional shape, when air flows into them it causes fluctuations in pressure difference between the inner and outer sides of the anchor tabs 29b at the ends of the film member 29. However, in this preferred embodiment, because the inflow of air to these flow passages is blocked by the draft deflectors 28d, fluctuations in pressure difference between the inner and outer sides of the film are suppressed.

As a result, self-excited vibration of the anchor tabs 29b at the ends of the film member 29 caused by such pressure difference fluctuations is suppressed, and extraneous noise (flapping noise) caused by interference between the anchor tabs 29b at the ends of the film member 29 and the side faces 28e of the door plate 28 is thereby suppressed.

Because an air-conditioner according to this preferred embodiment has the cool draft bypass passage 20 opened and closed by the cool draft bypass door 21, when the cool draft bypass passage 20 is open and the anchor tab 29b at the respective end of the film member 29 is positioned downstream of this cool draft bypass passage 20, a main current from the cool draft bypass passage 20 is on course to strike the anchor tab 29b particularly strongly. However, in this case, with this preferred embodiment, because the inflow of air to between the side faces 28e and the anchor tabs 29b is blocked by the draft deflectors 28d, self-excited vibration of the anchor tab 29b is effectively suppressed.

Figure 7:
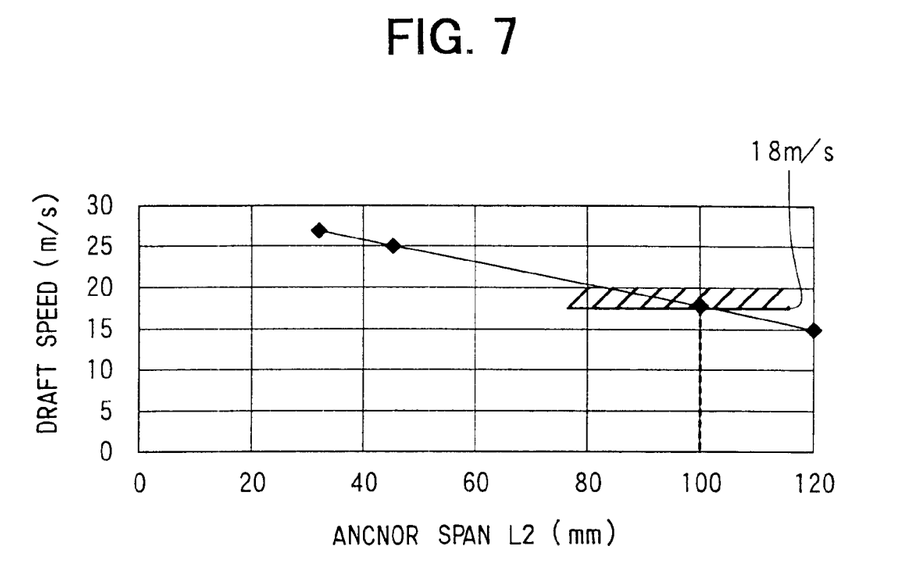
FIG. 7 is a graph of experimental data showing draft speeds at which extraneous noise is produced by the sliding door of the first preferred embodiment.

FIG. 7 is a graph showing draft speeds at which extraneous noise caused by self-excited vibration of the anchor tabs 29b at the ends of the film member 29 arise, and was obtained by measuring for different values of the anchor span L2 (see FIG. 3), which is the spacing of the anchor pins 28c, the draft speed at which extraneous noise arises in a sliding door 27 having the draft deflectors 28d of the first preferred embodiment described above. The draft speeds were measured at the location of the sliding door 27. The determination of whether or not extraneous noise was being produced was made by human ear at a position X (see FIG. 2) in the vicinity of the face port 22.

As can be seen from the results shown in FIG. 7, it was found that the draft speed at which extraneous noise is produced decreases as the anchor span L2 increases. This is because with increasing L2 the constraint of the anchor tabs 29b at the ends of the film member 29 is loosened and the anchor tabs 29b become more liable to self-excited vibration.

According to experiments carried out by the present inventors, when the draft speed at the sliding door 27 exceeds 18 m/s, the operating noise of the blower 13 becomes predominant over the extraneous noise caused by self-excited vibration of the anchor tabs 29b of the film member 29. And because the anchor span L2 at which draft speed=18 m/s is 100 mm, if the anchor span L2 is set to 100 mm or below, the draft speed at which the film member 29 produces extraneous noise will be higher than 18 m/s. Consequently, it is possible to eliminate discomfort caused by extraneous noise from the film member 29.

Second Preferred Embodiment

Figure 8:
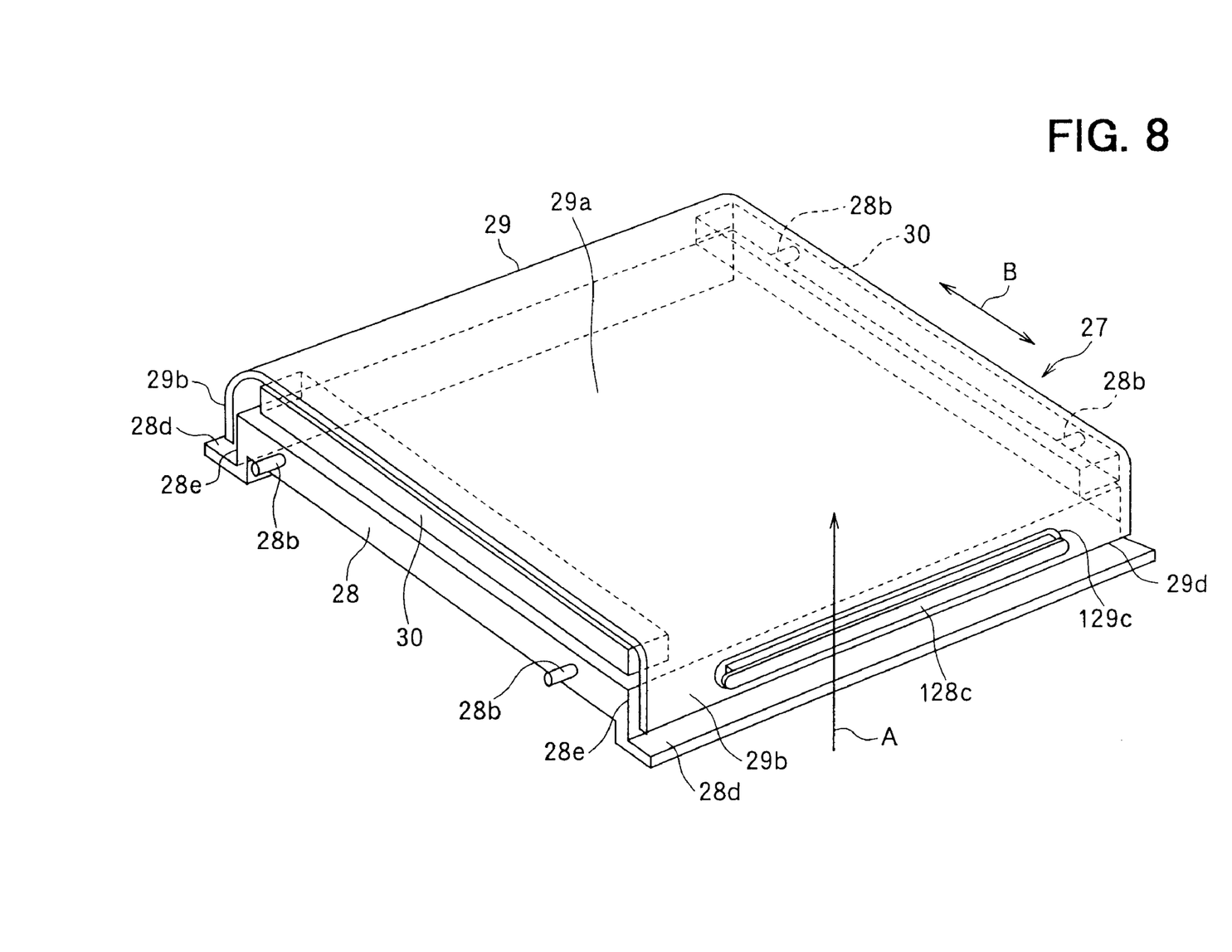
FIG. 8 is a perspective view of a sliding door of a second preferred embodiment.

FIG. 8 shows a second preferred embodiment of the present invention. In the second preferred embodiment, as shown in FIG. 8, instead of the plurality of cylindrical anchor pins 28c, an anchor pin 128c consisting of a single continuous slender projection extending in the width direction of the door plate 28 is formed on the door plate 28 of the sliding door 27. And a single slot-shaped anchoring hole 129c into which this single anchor pin 128c is inserted is formed in each of the anchor tabs 29b at the ends of the film member 29.

In this case, mating is between a single slender anchor pin 28c and a single slot-shaped anchoring hole 29c. Thus, the anchor tabs 29b are constrained over a wide area, and consequently the same effect as that of setting the anchor span L2 to 100 mm or below can be obtained.

Third Preferred Embodiment

Figure 9:
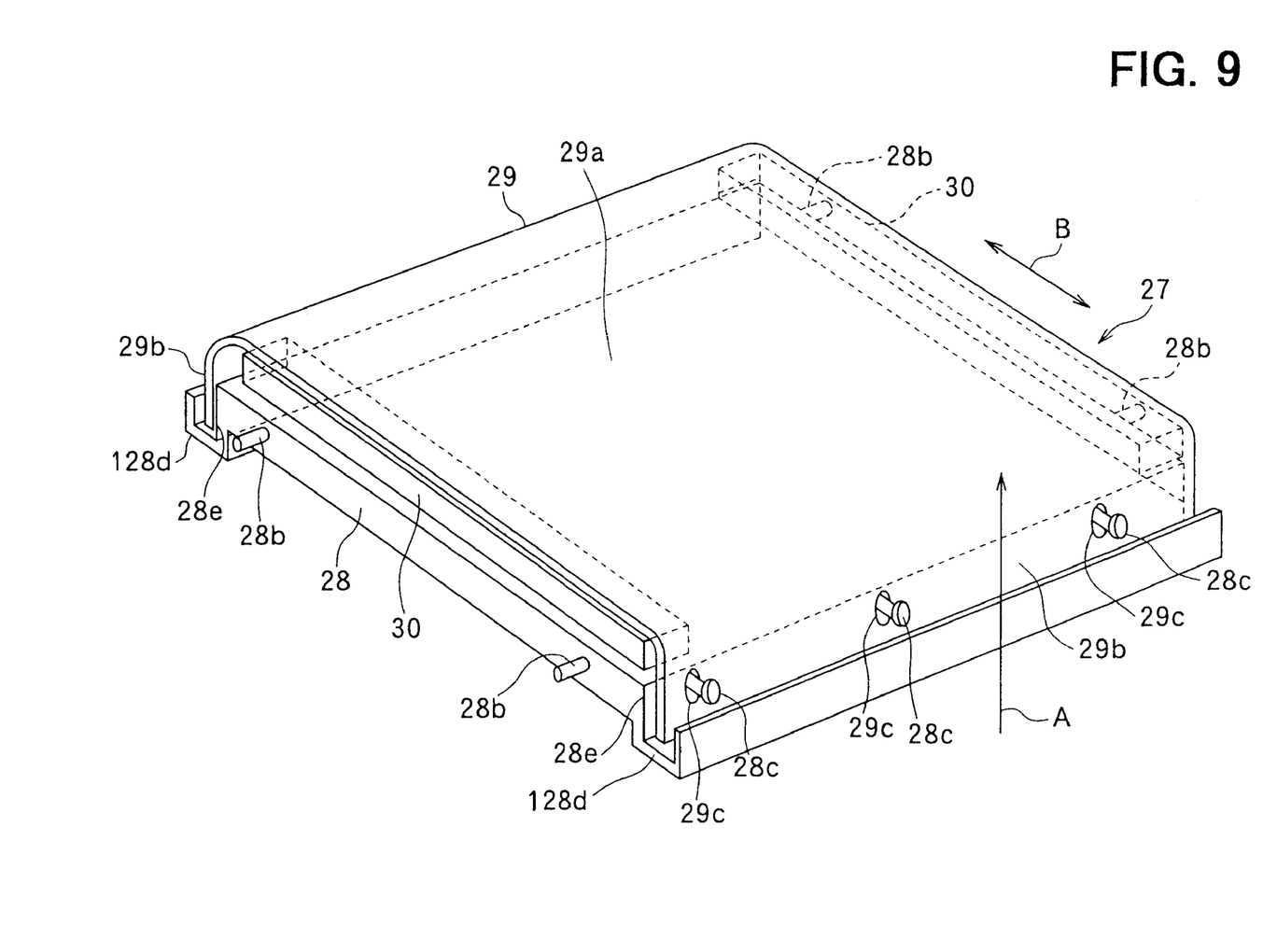
FIG. 9 is a perspective view of a sliding door of a third preferred embodiment of the present invention.

FIG. 9 shows a third preferred embodiment. In this second preferred embodiment, the draft deflectors 128d are each molded in the shape of a gutter extending over the entire length of the width dimension of the film member 29. As a result, both the inner side and the outer side of each of the anchor tabs 29b at the ends of the film member, 29 are covered by the gutter shape of the draft deflectors 128d. Thus, a main current of air can be prevented from directly striking either the inner side or the outer side of the anchor tab 29b. Consequently, the self-excited vibration suppressing effect of the anchor tabs 29b of the film member 29 is better than in the first and second preferred embodiments.

Fourth Preferred Embodiment

Figure 10:
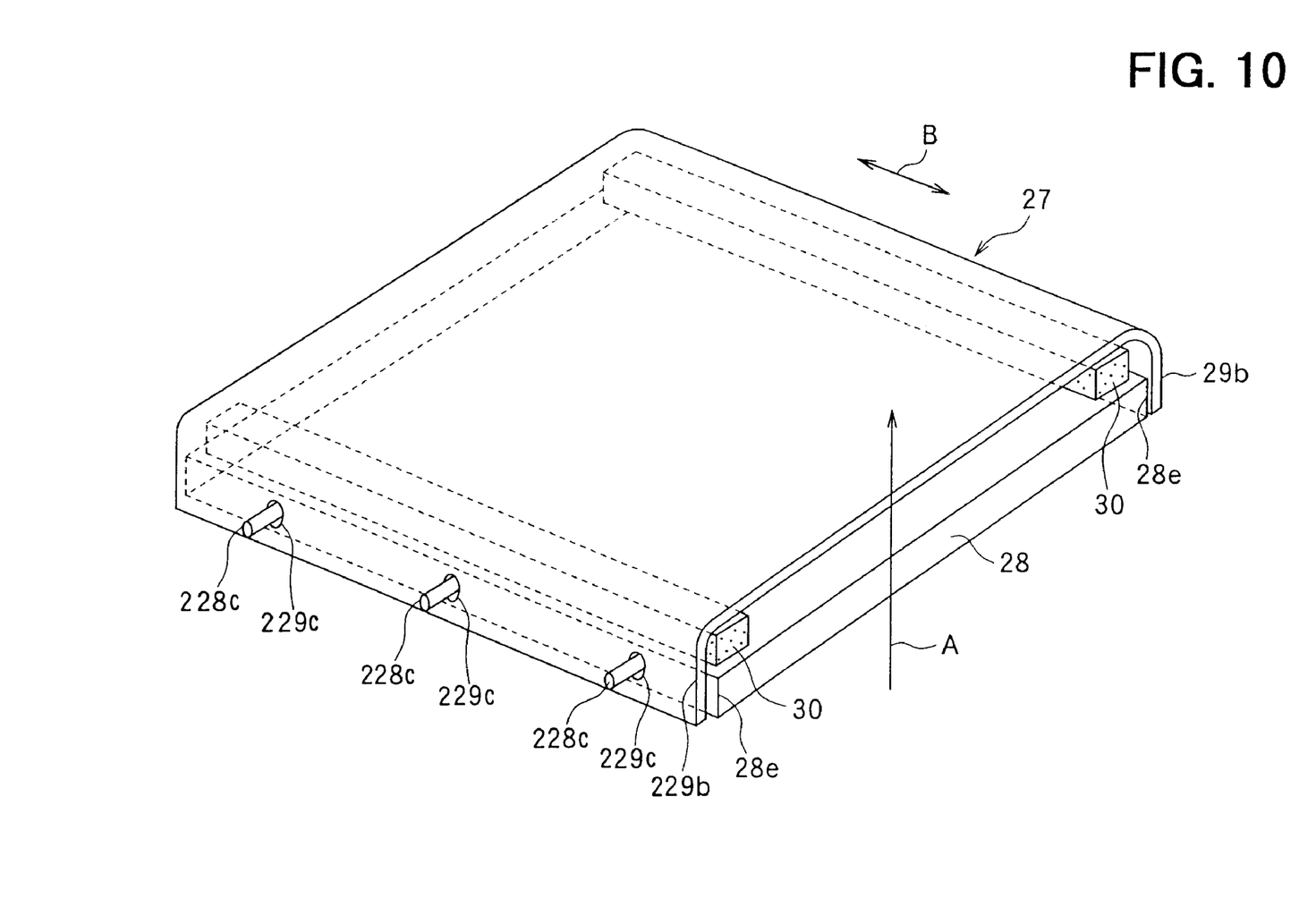
FIG. 10 is a perspective view of a sliding door of a fourth preferred embodiment of the present invention.
Figure 11:
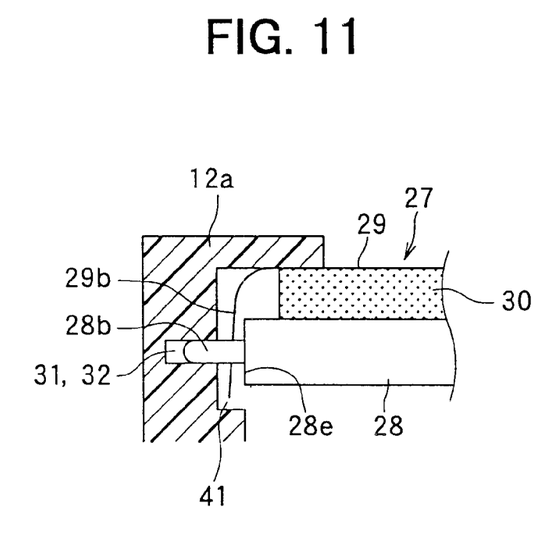
FIG. 11 is a cross sectional view of a portion of a sliding door according to the present invention.

FIGS. 10 and 11 show a fourth preferred embodiment. In the fourth preferred embodiment, as shown in FIG. 10, the anchor tabs 229b of the film member 29 are disposed at ends in the direction orthogonal to the door sliding direction B, and the anchor pins 228c also act as guide pins 28b of the door plate 28 (the role of anchoring the anchor tabs 29b to the door plate 28). And thus the anchor pins 28c of the first through third preferred embodiments can be dispensed with. Also, as shown in FIG. 11, concavities 41 for receiving the anchor tabs 29b of the film member 29 are formed in the inner walls of the case 12a where the guide channels 31, 32 in which the guide pins 28b fit are formed. The depth of these concavities 41 is set so that they shield both the inner and outer sides of the anchor tabs 29b of the film member 29 from the main air current. As a result, as in the third preferred embodiment, in this fourth preferred embodiment the self-excited vibration suppressing effect on the anchor tabs 29b of the film member 29 is improved.

Fifth Preferred Embodiment

Figure 12:
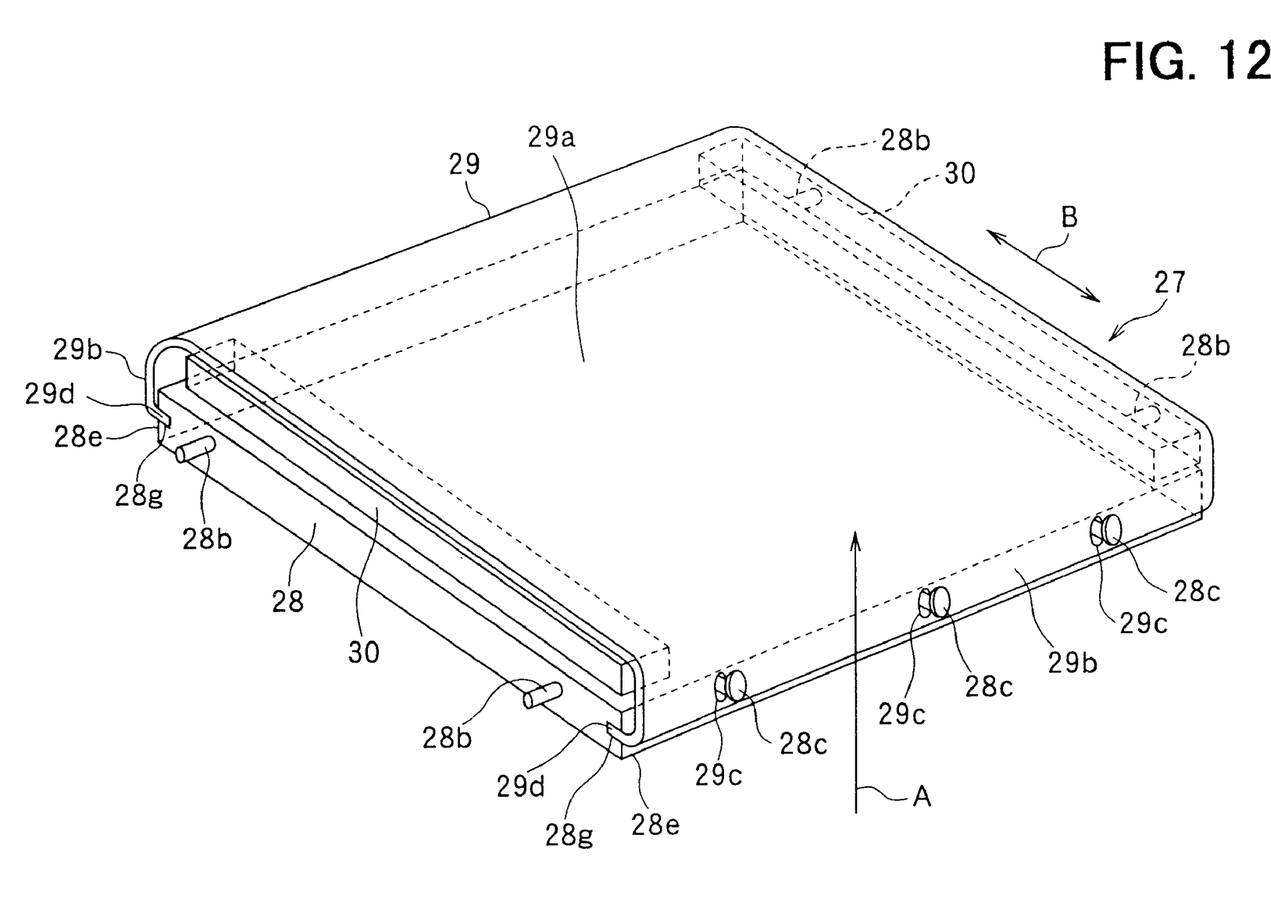
FIG. 12 is a perspective view of a sliding door of a fifth preferred embodiment of the present invention.

FIG. 12 shows a fifth preferred embodiment. Here, grooves 28g into which the ends 29d can be inserted are formed in the side faces 28e at the door sliding direction B ends of the door plate 28. This extends over the full length of the width dimension of the film member 29. The ends 29d of the anchor tabs 29b are formed bent toward the grooves 28g and are inserted into and held by the grooves 28g. In this way, air is prevented from flowing to the inner sides of the anchor tabs 29b by the bent shape of the anchor tabs 29b.

Sixth Preferred Embodiment

Figure 13:
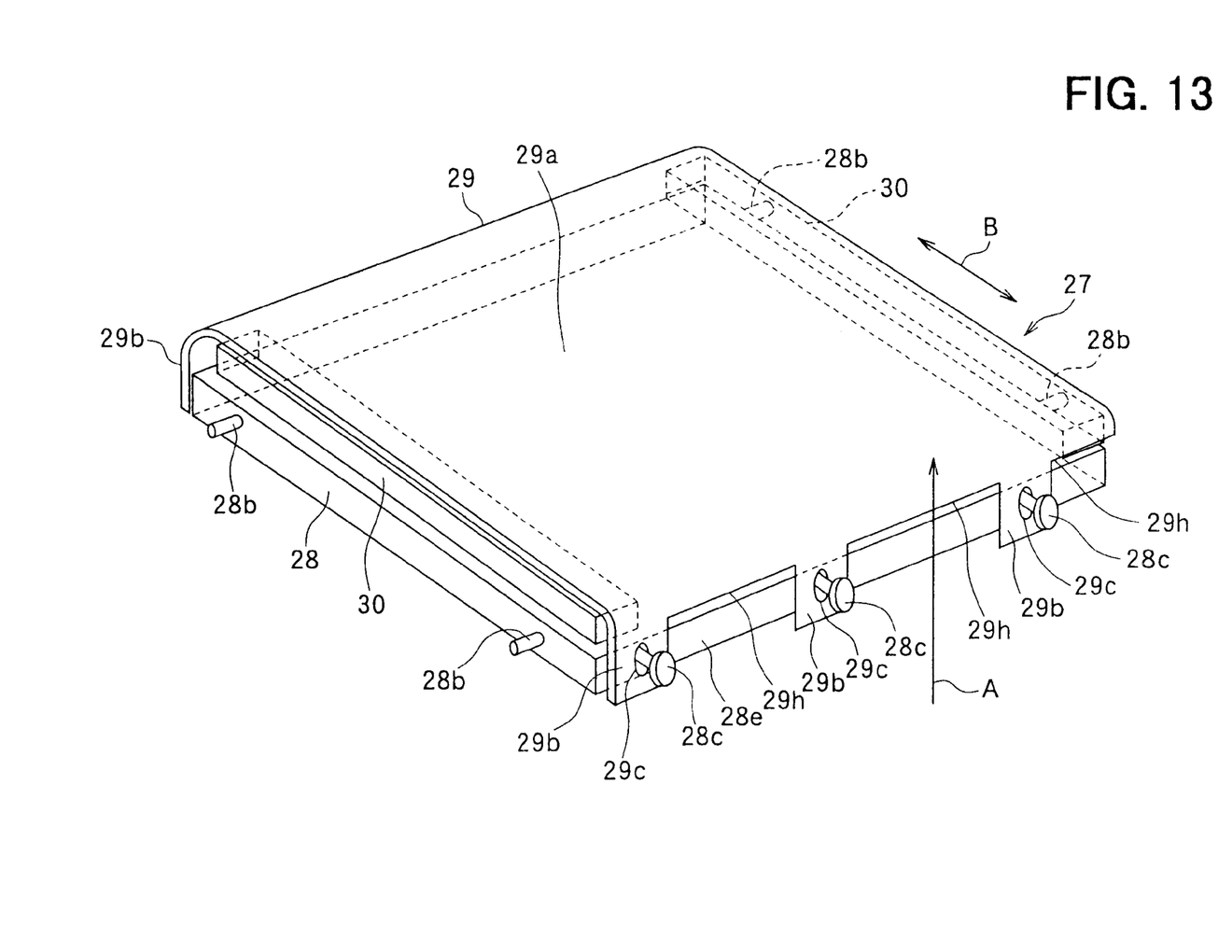
FIG. 13 is a perspective view of a sliding door of a sixth preferred embodiment of the present invention.

FIG. 13 shows a sixth preferred embodiment. Here, cutaways 29h are provided in the anchor tabs 29b of the film member 29 between the anchoring holes 29c. As such, only the parts of the anchor tabs 29b around the anchoring holes 29c remain, and air is allowed to pass freely through these cutaways 29h. Fluctuations in pressure difference between the inner and outer sides of the anchor tabs 29b and consequent self-excited vibration of the anchor tabs 29b are suppressed.

Figure 14:
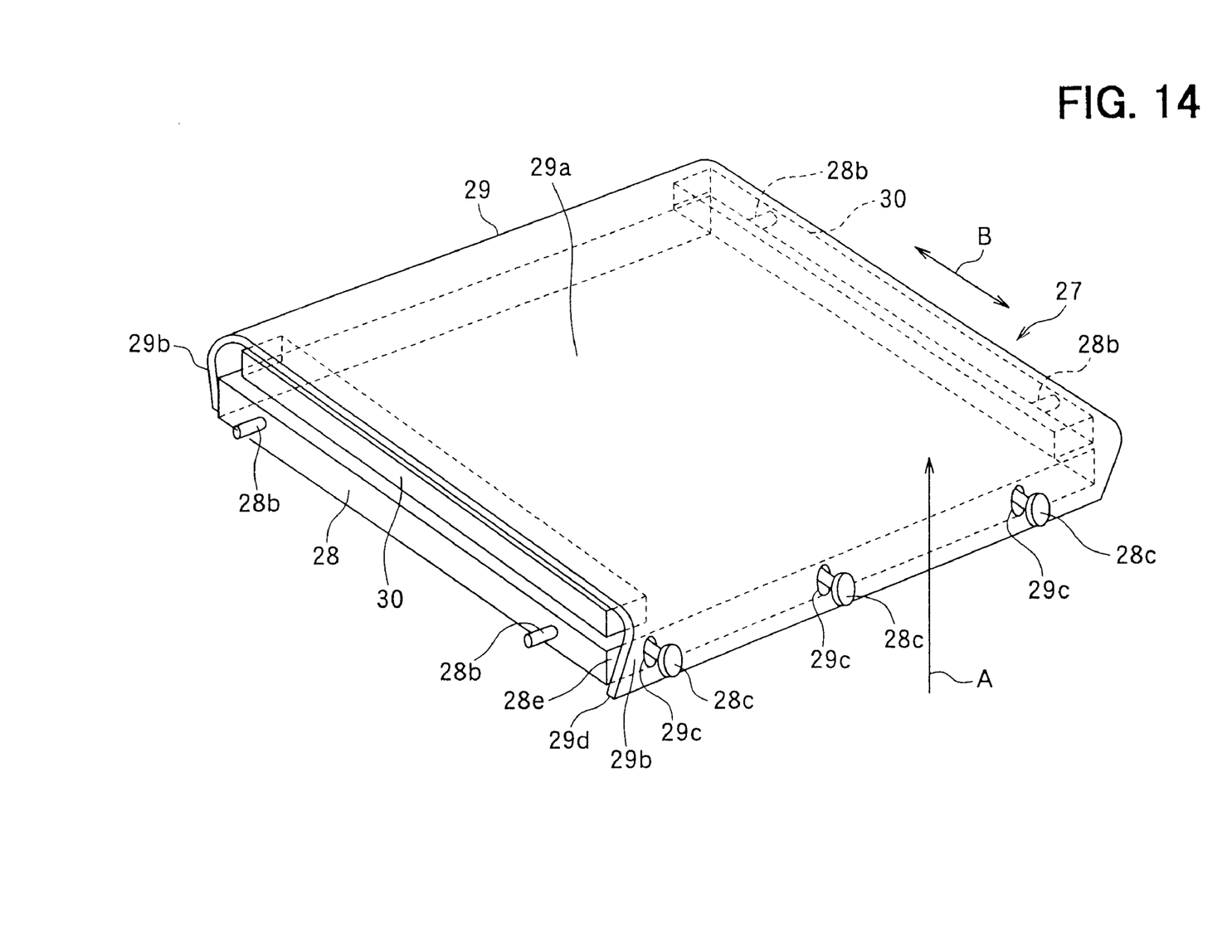
FIG. 14 is a perspective view of a sliding door of a seventh preferred embodiment of the present invention.
Figure 15:
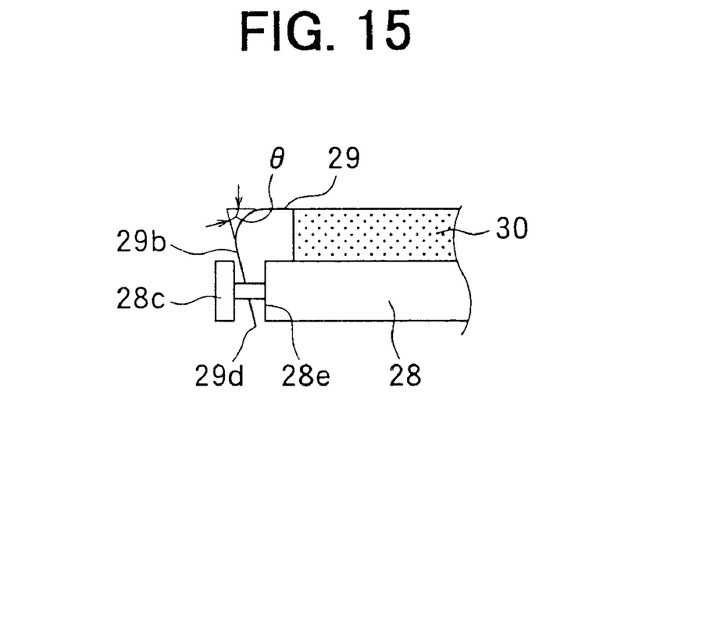
FIG. 15 is a cross sectional view or a portion of a sliding door according to the present invention.

FIGS. 14 and 15 show a seventh preferred embodiment. Here, the bend angles θ of the anchor tabs 29b with respect to the seal face 29a are smaller than 90°. To obtain an acute bend angle θ, the film member 29 is molded under predetermined heating conditions to reduce springback and maintain the bent shape of the anchor tabs 29b. Because the anchor tabs 29b have a bent shape with an acute angle, the ends 29d of the anchor tabs 29b are closer to the side faces 28e of the door plate 28 and the gaps between the anchor tabs 29b and the side faces 28e of the door plate 28 are narrowed.

Studies carried out by the present inventors have shown that as the bend angle θ of the anchor tabs 29b, specifically 89° to 80° is preferable. When the bend angle θ is small, the ends 29d of the anchor tabs 29b directly contact the side faces 28e of the door plate 28 and cause a change in the shape of the seal face 29a of the film member 29, which degrades its sealing effect. Therefore, a lower limit of about 80° on the bend angle θ is preferable. The upper limit on the bend angle θ is 89°, to obtain a bent shape with an acute angle, and preferably, to increase the effect of preventing the inflow of air to the above-mentioned gaps, the bend angle θ is 85° or less.

Other Preferred Embodiments

Although in all of the preferred embodiments described above a case wherein the sliding door 27 is applied to a door for switching outlet modes was described, a sliding door 27 according to the invention can also be applied to an inside/outside air switching door of a vehicle air-conditioner or to an air-mixing door for adjusting the flow proportions of a warm draft passing through a heater core 18 and a cool draft bypassing the heater core 18 through a cool draft bypass passage. And the invention can also be widely applied to air passage switching devices in applications other than vehicle air-conditioners.

What is claimed is:

1. An air passage switching device comprising:
   air passages;
   a sliding door which slides in a direction substantially orthogonal to a flow direction of air flowing through said air passages for opening and closing said air passages, the sliding door comprising:
   a flexible film member that presses against an edge seal face of the air passages, said flexible film member closing the air passages, a door plate having openings that allow a draft pressure to act on the flexible film member;
   anchor tabs at opposite ends of the film member, each of said anchor tabs being loosely anchored to side faces of the door plate to define a gap therebetween; and
   wherein the door plate is provided with draft deflectors extending from said side faces upstream of said gap that prevent the inflow of air into said gap between the anchor tabs and the side faces.

2. An air passage switching device according to claim 1, wherein the draft deflectors are positioned on an upstream side of ends of the anchor tabs, each of said draft deflectors being shaped as a flat plate.

3. An air passage switching device according to claim 1, wherein the draft deflectors are positioned on an upstream side of ends of the anchor tabs, each of the draft deflectors being shaped as a gutter for receiving an end of each respective anchor tab.

4. An air passage switching device according to claim 1, wherein the anchor tabs are anchored to the side faces of the door plate at a plurality of locations in a width direction of the film member, wherein an anchor span which is a spacing between anchored parts of the anchor tabs at said plurality of locations is not more than 100 mm.

5. The air passage switching device according to claim 1, wherein the anchor tabs are anchored on the side faces of the door plate so that the anchor tabs are movable in a direction of the draft pressure applied on the flexible film member.

6. The air passage switching device according to claim 5, wherein each of the side faces has a pin, and wherein each of the anchor tabs defines a hole through which the pin passes, the pin and the hole defining a space therebetween, the space being provided in the direction of the draft pressure.

7. The air passage switching device according to claim 6, wherein the hole is formed in a slot shape having a longitudinal axis in the direction of the draft pressure.

8. The air passage switching device according to claim 1, wherein each of the deflectors prevents the airflow through a respective gap.

9. The air passage switching device according to claim 8, wherein each gap is defined by an end edge of a respective anchor tab and a respective side face.

10. The air passage switching device according to claim 8, wherein each gap is provided by a respective anchor tab defining a hole.

11. The air passage switching device according to claim 1, wherein each of the side faces has a pin, and wherein each of the anchor tabs defines a hole through which the pin passes, the pin and the hole providing a space therebetween.

12. The air passage switching device according to claim 11, wherein each of the gaps formed between the anchor tabs and the side faces is defined by an end edge of a respective anchor tab and a respective side face.

13. The air passage switching device according to claim 1, wherein each of the anchor tabs is partly anchored on the side faces so as to provide a free edge of the anchor tab with respect to the side face, the free edge defining an inlet of the gap.

14. An air passage switching device according to claim 1, wherein the sliding door opens and closes air passages, air passing through said air passages into a passenger compartment.

15. An air passage switching device comprising:

air passages;

a sliding door which slides in a direction generally perpendicular to a flow direction of air flowing through said air passages for opening and closing said air passages, the sliding door comprising:

a flexible film member that presses against an edge seal face of said air passages, said flexible film member closing said air passages;

a door plate attached to said flexible film member, said door plate having openings that allow a draft pressure to act on said flexible film member and a pair of side faces extending generally parallel to said air flow direction;

an anchor tab disposed at opposite terminal ends of said flexible film member, each of said anchor tabs extending generally parallel to said air flow direction and being loosely anchored to a respective side face of said door plate to define a gap therebetween; and a draft deflector attached to each of said side faces of said door plate, said draft deflectors extending from said side faces of said door plate to cover said terminal ends of said flexible film member.

* * * * *